United States Patent [19]
Groth

[11] 3,849,244
[45] Nov. 19, 1974

[54] HEAT-REFLECTING LAMINATED SAFETY GLASS PANE

[75] Inventor: Rolf Groth, Witten, Germany

[73] Assignee: Flachglas Aktiengesellschaft DELOG-DETAG, Furth, Bayern, Germany

[22] Filed: Feb. 29, 1972

[21] Appl. No.: 230,370

[30] Foreign Application Priority Data
Mar. 3, 1971 Germany............................ 2109995

[52] U.S. Cl............. 161/199, 117/33.3, 117/71 R, 117/119, 117/124 B, 156/99, 156/325, 161/1, 161/192, 161/213, 161/408, 350/165, 350/311
[51] Int. Cl...................... B32b 17/10, B60j 3/00
[58] Field of Search....... 161/192, 196, 1, 199, 213, 161/408; 156/99, 325; 117/71 R, 119, 33.3, 124 B; 350/165, 199, 311

[56] References Cited
UNITED STATES PATENTS

| | | | |
|---|---|---|---|
| 2,601,806 | 7/1952 | Turner............................ | 350/165 X |
| 2,732,313 | 1/1956 | Cusano et al. .................. | 117/124 B |
| 3,069,301 | 12/1962 | Buckley et al...................... | 161/196 |
| 3,147,132 | 9/1964 | Geffcken ........................... | 117/33.3 |
| 3,188,513 | 6/1965 | Hansler............................ | 117/33.3 X |
| 3,325,266 | 6/1967 | Stong................................ | 161/193 |
| 3,493,289 | 2/1970 | Edwards........................... | 117/106 R |
| 3,516,720 | 6/1970 | Mauer.............................. | 161/196 X |
| 3,630,809 | 12/1971 | Edwards .......................... | 161/199 X |
| 3,660,137 | 5/1972 | Furuuchi et al. ................ | 161/196 X |

Primary Examiner—George F. Lesmes
Assistant Examiner—Charles E. Lipsey
Attorney, Agent, or Firm—Hill, Gross, Simpson, Van Santen, Steadman, Chiara & Simpson

[57] ABSTRACT

A heat-reflecting laminated safety glass pane includes a glass pane, a heat-reflecting stratum applied to the glass pane and comprising a plurality of individual layers, for example a ZnS-gold-ZnS combination, a laminating film applied over the heat-reflecting stratum and a covering pane attached to the laminating pane. In order to improve the splinter adhesion of such a pane, a vacuum-coated adhesive layer comprising a dielectric and substantially absorption free material is disposed between the glass pane and the heat-reflecting stratum. The adhesive layer comprises a metal fluoride and/or metal oxide and preferably has a coating temperature which is below that of the material of one of the layers of the heat-reflecting stratum whereby the same vacuum coating apparatus can be employed for the application of the adhesive layer and the relevant layer of the heat-reflecting stratum.

4 Claims, 1 Drawing Figure

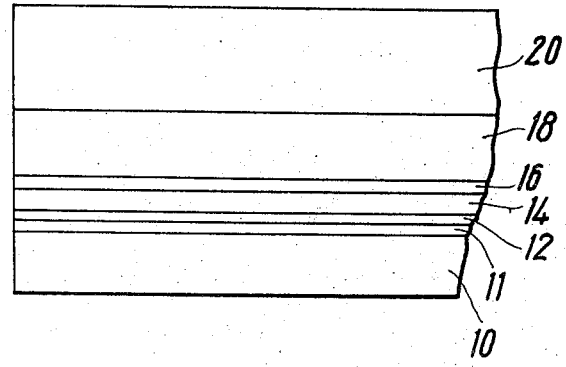

HEAT-REFLECTING LAMINATED SAFETY GLASS PANE

This invention relates to a heat-reflecting safety glass pane including a glass pane, a heat-reflecting stratum applied to the said glass pane and comprising of a plurality of individual layers, preferably a ZnS-gold-ZnS combination, a laminating film and a covering pane. The invention also concerns a method for producing such a pane.

Heat-reflecting laminated safety glass panes of the kind described above are characterised by a high light transmissivity in the range of visible light and a high reflectivity, that is to say a low transmissivity, in the range of thermal radiation. In the production of panes of this kind a gold film, disposed between a pair of dielectric anti-reflection coatings of a material with a high refractive index, is first applied to a glass pane. The said triple coating is applied by vacuum coating means. ZnS has been found reliable as a dielectric anti-reflection coating since it may be easily evaporated from suitable evaporating means at a temperature of approximately 1200°C, which can be readily controlled in terms of production technology and in which the film thicknesses required for producing anti-reflection characteristics in the gold film have practically no absorption in the range of visible light. The thickness of the two ZnS layers between which the gold stratum is sandwiched is selected so that the greatest possible anti-reflection effect is achieved in the range of maximum light sensitivity of the human eye, that is to say at approximately a wavelength $\lambda = 550\ m\mu$. Accordingly, the dielectric anti-reflection coatings have a thickness of approximately 450 A, while the thickness of the gold film is approximately 300 A.

In known heat-reflecting laminated safety glass panes, a second glass pane is adhesively fixed as a covering pane, by means of an adhesive intermediate lamina, usually a polyvinyl butyral film, on to the first glass pane which is coated on one side with the heat-reflecting stratum. The heat-reflecting stratum is therefore disposed in the interior of the duplex pane laminated safety glass pane and is thus protected against the effects of weather and against mechanical damage. This is of particular advantage compared to a safety glass pane which is coated on the exterior because the heat-reflecting stratum is not very resistant to the effects of weather and is moreover relatively sensitive to scratches so that even cleaning of the pane may in some circumstances result in damage of the heat-reflecting stratum.

Heat-reflecting laminated safety glass panes of this kind are used in particular in motor vehicles or aircraft. The panes must therefore satisfy certain safety requirements, that is to say they must have a certain resistance and puncture resistance against mechanical stresses, for example due to the impact of objects. It is particularly important that, in the event of damage to the laminated safety glass pane, no glass splinters become detached from the laminated sheeting which might cause serious injury to the passengers in the vehicle.

It has been found that known laminated safety glass panes, provided with a heat-reflection stratum, do not have sufficient splinter adhesion in phantom drop tests. The heat-reflecting stratum does not reduce the puncture resistance by comparison with normal laminated safety glass panes without such a heat-reflecting stratum, but glass splinters, which might cause serious injuries to passengers in the vehicle, are detached in part zones when the pane is subjected to impact stresses.

Attempts have been made to remedy this disadvantage of heat-reflecting laminated safety glass panes by careful polishing and/or cleaning prior to vacuum coating the surface of the glass pane on which the heat-reflection stratum is to be applied, including a surface treatment by glow discharge at a $10^{-2}$ torr vacuum, but no sufficient and reproducible splinter adhesion could be achieved thereby for panes of a size required for practical application.

An object of the invention is to provide a heat-reflecting laminated safety glass pane of the kind mentioned hereinbefore, having satisfactory splinter adhesion with the glass pane coated with the heat-reflecting stratum as well as with the covering pane.

According to the invention this problem is solved in that a vacuum-coated adhesive layer comprising a dielectric and substantially absorption-free material is disposed between the glass pane and the heat-reflecting stratum.

It has been surprisingly found that the aforementioned adhesive layer enables the splinter adhesion of the heat-reflecting laminated safety glass panes to be substantially improved. The adhesive layer preferably comprises a metal fluoride and/or a metal oxide. When using a metal fluoride it is advantageous if its melting or sublimation temperature is above 1000°C. Layers comprising thorium fluoride, sodium fluoride, cryolite ($Na_3AlF_6$), magnesium fluoride, lanthanum fluoride, cerium fluoride and silicon oxide have been found to be suitable to this end.

Layer thicknesses of approximately 30 A and 100 A have been found suitable for the adhesive layer. Adhesive layers of this thickness range do not produce any substantial interference effects so that the optical properties of the heat-reflecting panes are not influenced by the additional adhesive layer. On the other hand, layer thicknesses of this order are sufficient to ensure adequate splinter adhesion over the entire surface of the pane even if the glass pane which supports the heat-reflecting layer has the conventional surface texture of commercial glass.

According to one preferred embodiment of the invention the coating temperature of the material of the adhesive layer is below that of the first, second or third, preferably of the first individual layer of the multi-layer heat-reflecting stratum. This offers the advantage that the adhesive layer and the first, second or third individual layer may be coated from the same vacuum coating apparatus which is first raised to a temperature required for evaporating the material of the adhesive layer but is not sufficient for evaporating the material of the relevant individual layer, whereupon, appropriately after intermediate cooling, the temperature is increased to such an extent that the material of the relevant individual layer may also be evaporated.

This procedure advantageously avoids the technological additional expense resulting from additional vacuum coating apparatus for the vacuum coating of the adhesive layer.

It is particularly advantageous if the adhesive layer is applied from the vacuum coating apparatus which is used for the application of the first individual layer of the heat-reflecting stratum since this is the simplest procedure in terms of process technology. It is advantageous if, for example, thorium fluoride is employed which has an evaporation temperature of approximately 1050°C. To this end, the vacuum coating apparatus intended for the first individual layer of the heat-reflecting stratum is additionally provided with ThF$_4$. The vacuum coating apparatus is then heated so that thorium fluoride evaporates at approximately 1050°C, followed by heating to approximately 1200°C at which temperature the ZnS for the first layer of the actual heat-reflection stratum is evaporated.

All conventional kinds of vacuum coating apparatus may naturally be employed for applying the adhesive layer, such apparatus being raised to the required evaporation temperature, for example by direct electric heating. Electron beam evaporation of the material of the adhesive layer is also possible.

Further features and advantages of the invention are disclosed in the description given hereinafter relating to exemplary embodiments of the invention which are described with reference to the attached schematic drawing of a heat-reflecting laminated safety glass pane according to the invention.

The drawing shows a section of a laminated safety glass pane according to the invention. An adhesive layer 11 of thorium fluoride is disposed on a glass pane 10 and is followed by a first ZnS layer 12, a gold film 14 and a second ZnS layer 16. The glass pane 10, coated in this manner, is joined by means of a polyvinyl butyral sheet 18 to a covering pane 20. The covering pane 20 may be constructed not only of glass but also of some suitable plastics material. In appropriate cases the gold film may be advantageously employed for electric resistance heating.

EXAMPLE 1

Ten float glass panes, having a size of 110 cm × 50 cm and a thickness of 3 mm were carefully cleaned and introduced into a full-scale vacuum coating plant. The vacuum coating plant was provided with three vacuum coating means, adapted to be heated independently of each other and serving for the application of the three individual layers of the heat-reflecting stratum, namely the first ZnS layer, the gold film and the second ZnS layer. The vacuum coating means were provided with the required substances and thorium fluoride was also fed into the vacuum coating apparatus intended for applying the first anti-reflection layer.

After evacuation to a vacuum of approximately 3 × 10$^{-2}$ torr the glass surfaces to be coated were cleaned for 8 minutes by glow discharge. The system was subsequently evacuated to a vacuum of approximately 7 × 10$^{-5}$ torr whereupon the adhesive layer of thorium fluoride as well as the three individual layers of the heat-reflection stratum were successively applied by vacuum coating. To this end, the vacuum coating means fed with thorium fluoride and ZnS was first raised to a temperature of approximately 1050°C at which the thorium fluoride evaporated while forming an adhesive film of approximately 60 A thickness. After the temperature was raised to approximately 1200°C, this was followed by vacuum coating of the first individual layer of the heat-reflection stratum, that is to say the first ZnS anti-reflection lamina whereupon the gold film was vacuum coated followed finally by vacuum coating of the second ZnS anti-reflection stratum.

The thickness of the two ZnS strata was approximately 450 A, while the thickness of the gold stratum was approximately 300 A.

The glass panes, vacuum coated in this manner were then joined on the coated side to a covering glass pane of 2 mm thickness by means of an adhesive intermediate lamina of polyvinyl butyral having a thickness of approximately 0.38 mm or 0.76 mm. A subsequent phantom drop test for testing the puncture resistance and splinter adhesion by means of a phantom test member of 10 kg weight dropped from a height of 1.50 m (0.138 mm thick PVB film) or from a height of 4 m (0.76 mm thick PVB film) indicated that the laminated safety glass pane has the required puncture resistance and very good splinter adhesion. The glass splinters adhere firmly everywhere on the adhesive intermediate lamina, that is to say on the polyvinyl butyrene sheet.

EXAMPLE 2

Ten float glass panes were cleaned and vacuum coated under the same conditions as those outlined in example 1. By contrast to example 1, an adhesive film of cryolite of a thickness of approximately 80 A was applied instead of thorium fluoride. To this end, the cryolith was first introduced together with the ZnS into the vacuum coating apparatus intended for applying the first individual layer of the heat-reflecting stratum. The cryolite was first evaporated from the aforementioned vacuum coating apparatus at a temperature of approximately 1050°C, this being followed by evaporation of the ZnS for vacuum coating the first anti-reflection layer at approximately 1200°C. This is followed, as in example 1, by vacuum coating of the gold and once again of ZnS.

The phantom drop test, performed under the same conditions as those described in example 1, in this case also indicated the required puncture resistance and very good splinter adhesion. However, if ten float glass panes of the same dimensions are vacuum coated with the triple laminar heat-reflection stratum under the same conditions but without the adhesive layer to be combined to form a laminated safety glass pane, the phantom drop test will indicate that the required puncture resistance is also achieved in this case but that splinter adhesion is completely insufficient. In all panes produced in this manner zones in which the glass splinters adhere on the laminated sheet alternate with zones in which the glass splinters become detached and could lead to serious injuries.

The features of the subject of the application disclosed in the description hereinabove, in the drawing and in the claims which follow may be employed either individually as well as in any desired combination.

I claim:

1. A heat reflective, safety glass laminate exhibiting improved splinter adhesion adapted for use in motor vehicles and aircraft comprising, in face-to-face, sequential bonded engagement with one another
    A. a first layer comprising a glass pane,
    B. a second layer ranging from about 30 to 100A in thickness of a vacuum vapor deposited material selected from the group consisting of thorium fluoride, sodium fluoride, cryolite, magnesium fluoride, lanthanum fluoride, and cerium fluoride each having a vaporization temperature above about 1000°C, C. a third layer which is substantially transparent consisting essentially of high refractive index zinc sulfide,
D. a fourth layer which is substantially transparent consisting essentially of gold,
E. a fifth layer which is substantially transparent consisting essentially of high refractive index zinc sulfide,
F. a sixth layer consisting essentially of an adhesive organic polymeric transparent film, and
G. a seventh layer comprising a glass pane.

2. The laminate of claim 1 wherein said second layer is deposited by vacuum vapor deposition on said first layer at a temperature below the vaporization temperature of zinc sulfide.

3. The laminate of claim 1 wherein said second layer comprises thorium fluoride.

4. The laminate of claim 1 wherein said second layer comprises cryolite.

* * * * *